J. DAVIS, Jr.
Lamp.
No. 63,999.
Patented April 23, 1867.
Fig. 1
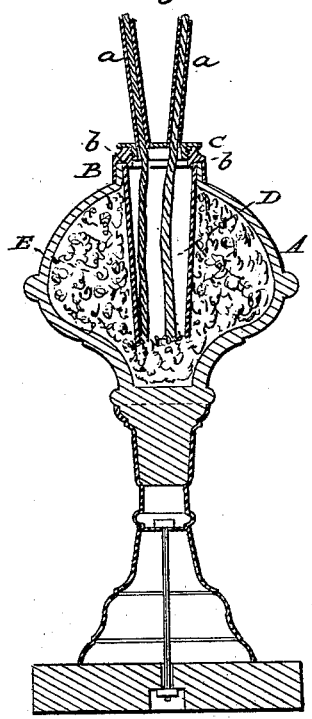
Fig. 2
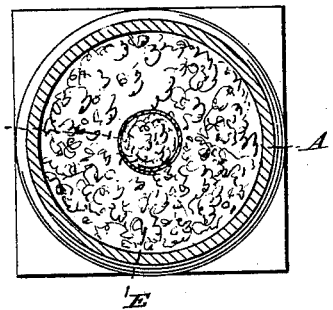
Fig. 2
Fig. 3
Witnesses:
Samuel N. Piper
Geo. H. Andrews.
Inventor:
Joseph Davis Jr.
by his attorney
R. H. Eddy.

United States Patent Office.

JOSEPH DAVIS, JR., OF TEMPLETON, MASSACHUSETTS.

Letters Patent No. 63,999, dated April 23, 1867; antedated October 23, 1866.

---

IMPROVEMENT IN LAMPS.

---

The Schedule referred to in these Letters Patent and making part of the same.

---

TO ALL PERSONS TO WHOM THESE PRESENTS SHALL COME:

Be it known that I, JOSEPH DAVIS, Jr., of Templeton, in the county of Worcester, and State of Massachusetts, have invented a new and useful Improvement in Lamps for burning volatile hydrocarbons, and do hereby declare the same to be fully described in the following specification, and represented in the accompanying drawings, of which—

Figure 1 is a vertical section; and

Figure 2, a horizontal section of a lamp provided with my improvement.

Figures 3 and 4 are hereinafter described.

My invention has special reference to such lamps as have their fluid reservoirs filled or stuffed with cotton or a fibrous or absorbent material. As these lamps are commonly made they contain a foraminous wick-holder or case to extend from the mouth of the lamp down into the body of its reservoir, such case being of a tubular form, and being surrounded with the cotton stuffed into the reservoir. In such lamps, especially when made of glass, a difficulty has been experienced in introducing the cotton and packing it around the foraminous wick-holder. To accomplish this the lamp has usually been made with an auxiliary filling orifice arranged either through its bottom or side, the cotton being passed through such orifice into the reservoir, after the introduction therein of the foraminous tube or case. With my invention I avoid the necessity of such orifice, and insert the cotton into the lamp through its mouth or cap. To accomplish this I employ an expansive tube, that is, a tube composed of a rectangular plate of metal bent in the form of conic frustum, and so that one of its edges may overlap the other; a top view of such tube being shown in fig. 3, and a side view of it in fig. 4. This tube I introduce into the lamp fountain by or through its mouth, and with the smaller base of the frustum uppermost, the tube being contracted, so that when in the mouth there shall be within the said mouth, and around the tube, an annular space or opening through which the fibrous packing or cotton may be introduced into the lamp and around the tube or frustum. After having thus inserted a sufficient amount of the cotton into the lamp reservoir, I, by any suitable means, as a round and conical plug, for instance, expand the tube into a cylindrical form, and so as to annul the said annular space, and cause the upper part of the tube to fit to the mouth of the lamp, or that of the cap thereof, or into an annular recess made therein. The tube, in case it may have no hole in its side or sides, should not reach down to the bottom of the lamp reservoir, but should terminate near the same and upon some of the cotton laid therein.

In figs. 1 and 2 of the drawings, A denotes the lamp, fountain, or reservoir; B its cap, C the wick-tube holder, $a\ a$ the wick tubes, D the expansive tube, and E the mass of fibrous material or cotton packed around and beneath the tube. The wick or wicks are to go into the said tube and rest on the cotton at the bottom thereof. The tube-receiving recess in the cap is shown at $b\ b$. The expansive tube once expanded is contractible so as to be capable of being easily removed from the lamp and the recess in the cap thereof at any time in case it may be desirable to remove the cotton from the lamp preparatory to the substitution of a fresh supply of it.

I make no claim to a lamp as made with a foraminous non-expansive tube or case, to extend down from its cap and into its fluid reservoir, and be surrounded with a packing of cotton or other suitable absorbent material, the purpose of such packing being to hold a combustible fluid and prevent it from being spilled about in case of the breakage of the lamp.

What I claim as my invention is the application of an expansive tube or case, and a mass of cotton or fibrous stuffing to a lamp reservoir, substantially in manner as described; such tube, in course of its application, and after the insertion of the cotton or filling, being expanded as explained.

I also claim the lamp as constructed with the tube-receiving recess, as explained.

I also claim the improved lamp as constructed with the expansible tube and the receiving recess therefor, and as having a mass of cotton or fibrous material arranged in its reservoir and about such tube, as set forth.

JOSEPH DAVIS, Jr.

Witnesses:
R. H. EDDY,
GEORGE ANDREWS.